United States Patent [19]
Dalton

[11] Patent Number: 5,607,757
[45] Date of Patent: Mar. 4, 1997

[54] PAPER MACHINE FABRIC

[75] Inventor: James S. N. Dalton, Kingsport, Tenn.

[73] Assignee: Eastman Chemical Company, Kingsport, Tenn.

[21] Appl. No.: 552,658

[22] Filed: Nov. 30, 1995

Related U.S. Application Data

[63] Continuation of Ser. No. 459,933, Jun. 2, 1995, abandoned.

[51] Int. Cl.$^6$ ....................................... D03D 3/00
[52] U.S. Cl. .................. 442/301; 139/323 A; 162/358.1; 442/414
[58] Field of Search ..................... 428/225, 229; 162/358.1; 139/383 A

[56] References Cited

U.S. PATENT DOCUMENTS

| | | | |
|---|---|---|---|
| 3,161,710 | 12/1964 | Turner | 264/216 |
| 3,616,832 | 12/1969 | Shima et al. | 152/361 |
| 3,975,329 | 8/1976 | Barnewall et al. | 260/75 |
| 4,000,239 | 12/1976 | Hamana et al. | 264/176 |
| 4,026,973 | 5/1977 | Shima et al. | 264/235 |
| 4,829,681 | 5/1989 | Josef | 34/123 |
| 5,169,499 | 12/1992 | Eagles et al. | 428/175 |
| 5,246,992 | 9/1993 | Wick et al. | 524/195 |
| 5,405,685 | 4/1995 | Patel | 428/229 |

FOREIGN PATENT DOCUMENTS

| | | | |
|---|---|---|---|
| 62-156312 | 7/1987 | Japan | D01F 6/62 |
| 604073 | 6/1948 | United Kingdom . | |
| 1445464 | 8/1976 | United Kingdom | D01F 6/62 |

OTHER PUBLICATIONS

Japanese Kokai Patent Application No. Sho 49 [1974] –61409 (Eq. JP 56 27639B, pp. 1–11.

*Primary Examiner*—James J. Bell
*Attorney, Agent, or Firm*—Betty J. Boshears; Harry J. Gwinnell

[57] ABSTRACT

This invention relates to an article of paper machine fabric used in a papermaking machine which is essentially a fibrous structure comprising monofilament yarns wherein the monofilament yarns comprise a polyester comprising from about 85 to 100 mole % of 2,6-naphthalenedicarboxylic acid and about 85 to 100 mole % of ethylene glycol or 1,4-cyclohexanedimethanol, based on the total mole percentage for the glycol portion and for the acid portion of the polyester each equalling 100 mole %.

This invention provides good resistance to hydrolytic and dry heat degradation, good dimensional thermal stability, and good resistance to deformation.

15 Claims, No Drawings

PAPER MACHINE FABRIC

This is a continuation of U.S. patent application Ser. No. 08/459,933 filed on Jun. 2, 1995, now abandoned.

FIELD OF THE INVENTION

This invention relates to a paper machine fabric having use in a paper making machine, particularly in the drying sections.

BACKGROUND OF THE INVENTION

Paper making machine fabric for use in the drying sections of a paper making machine are sometimes composed of polyethylene terephthalate (PET) monofilaments which have previously been preferred over multifilament fabric because they clean easily, they have good abrasion resistance, and they leave a more desired surface on the paper. The life of hydrolytically stabilized polyethylene terephthalate fabrics is still limited mainly because of hydrolysis of the polyethylene terephthalate ester linkages. Extended life of the monofilament fabrics is desired in order to reduce paper machine downtime. Increased paper making machine speed can be achieved with these new fabrics if the same lifetime is planned. In addition hydrolytically stabilized polyethylene terephthalate monofilament fabrics do not have sufficient life to be used in certain brown paper and higher speed paper making operations. Under these more severe drying conditions fabrics composed of multifilament yarns of NOMEX (an aromatic polyamide fiber sold by DuPont), glass, and PET are used. It is desired to replace these multifilament yarn fabrics with monofilament fabrics for ease of cleaning and better paper surface characteristics. No monofilament fabrics with acceptable cost/performance levels have been found for these more severe drying applications. Monofilament fabrics which are used in food contact processing usually require U.S. Food and Drug Administration approval. Most PET hydrolytic stabilizers used in the monofilament fabrics do not have FDA approval. Because of this lack of FDA approval, PET monofilament fabrics are used in food processing without hydrolytic stabilizers which results in a short life span for these fabrics.

Polypropylene is the cheapest material presently available; it has excellent hydrolytic stability, but poor dimensional stability at elevated temperature, and as a result it has only limited use.

Polyphenylene sulfide has excellent dimensional and hydrolytic stability, but suffers from the disadvantage that it is extremely highly priced, is more difficult to work, and tends to suffer from brittle fracture problems in the crystalline state due to normal flexing experienced on the paper machine.

U.S. Pat. No. 4,026,973, assigned to Teijin Limited, Osaka, Japan, discloses heat resistant polyester filaments comprising an aromatic polyester in which at least 90 mole % of the structural units are ethylene-2,6-naphthalate units having specific properties. Copolymers reported to be useful include those containing less than 10 mole % and preferably less than 5 mole % comonomer. A wide range of modifying acids and glycols are listed. This list includes 2,7-naphthalenedicarboxylic acid.

U.S. Pat. No. 3,161,710 discloses a polymerization process for polyester films. A large number of polyester homopolymers and copolyesters are disclosed including those containing 0 to 25 mole % of 2,6-, and 2,7-naphthalenedicarboxylic acid.

Some patents dealing with PEN as fibers for use in applications such as tire cord include Japan Kokai 156,312 (1987), U.S. Pat. No. 3,616,832 (1969), Great Britain 1,445,464 (1976), and U.S. Pat. No. 4,000,239 (1976).

U.S. Pat. No. 3,975,329 (1976) assigned to The Goodyear Tire and Rubber Co. describes industrial polyester yarns such as those based on poly(ethylene terephthalate) having improved hydrolytic and thermal stability. The improved stability is reported to be achieved by spinning the polyester in the presence of a carbodiimide which is reported to react with free carboxyl groups.

U.S. Pat. No. 4,829,681 (1989) assigned to Albany International Corp. discloses a paper machine dryer fabric which comprises fabrics made from interwoven synthetic, polymeric polyester resins.

U.S. Pat. No. 5,169,499 (1992) assigned to Albany International Corp. discloses an article of paper machine clothing which consists essentially of a woven polyester material which is a copolyester of terephthalic acid, isophthalic acid and 1,4-cyclohexanedimethanol.

None of the above described references solve all of the numerous problems in the art of lack of resistance to hydrolytic and dry heat degradation, lack of dimensional thermal stability, and lack of resistance to deformation.

Therefore, there is a need in the art for an article of paper machine fabric containing a fibrous structure with improved resistance to hydrolytic and dry heat degradation, improved dimensional thermal stability, and improved resistance to deformation which overcomes the above described deficiencies.

SUMMARY OF THE INVENTION

According to one aspect of the present invention, there is provided an article of paper machine fabric used in a papermaking machine which is essentially a fibrous structure comprising monofilament yarns wherein said monofilament yarns comprise a polyester comprising from about 85 to 100 mole % of 2,6-naphthalenedicarboxylic acid and about 85 to 100 mole % of ethylene glycol or 1,4-cyclohexanedimethanol, based on the total mole percentage for the glycol portion and for the acid portion of said polyester each equalling 100 mole %.

According to another aspect of the invention, there is provided a paper machine dryer fabric, which comprises:
interwoven machine direction monofilament yarns of a synthetic, polymeric, polyester resin and cross-machine direction synthetic, polymeric, polyester resin monofilament yarns, said monofilament yarns comprising:
a polyester comprising from about 85 to 100 mole % of 2,6-naphthalenedicarboxylic acid and about 85 to 100 mole % of ethylene glycol or 1,4-cyclohexanedimethanol, based on the total mole percentage for the glycol portion and for the acid portion of said polyester each equalling 100 mole %.

DETAILED DESCRIPTION OF THE PREFERRED EMBODIMENTS

This invention relates to new and improved fabrics which are derived from naphthalenedicarboxylate polyester monofilaments. These fabrics have improved resistance to hydrolytic and dry heat degradation, improved dimensional thermal stability, and improved resistance to deformation when compared to state of the art polyethylene terephthalate monofilament fabrics. They are useful mainly as monofilament dryer fabrics and forming fabrics on paper making machines, and monofilament base fabrics for papermaking felts. They also can be useful in the pressing section of a paper making machine. They also have utility as monofilament fabrics for food processing, monofilament fabrics for filtration, and other applications where monofilament fabrics require hydrolytic stability, thermal dimensional stability, and deformation stability under load.

In paper making machines, a slurry of paper making constituents referred to as "finish" is deposited on a fabric or "wire" and the liquid constituent of the furnish is drawn or extracted through the fabric or wire to produce a self-cohesive sheet. This cohesive sheet is passed to a pressing and drying section of a paper making machine. In the pressing section of the machine, the paper sheet is transported by a felt to a pair of rollers where the felt and paper sheet are passed between the nip of the rollers to dewater and dry the paper sheet. The paper sheet itself may contain all types of chemical finishes and will be at the same time, subjected to an elevated temperature in order to aid the dewatering and drying thereof.

After pressing, the paper sheet passes to the drying section of the machine where it is dried at an elevated temperature. The fabric in the drying section of the machine together with its sheet of paper tends to be subjected to elevated temperatures in a rigorous chemical environment. Dryer fabrics or "dryer screens" employed in the paper making industry have, traditionally, been formed from a variety of materials such as poly(ethylene terephthalate), polyphenylene sulfide and polypropylene. Each material has different properties and pricing, which affects its relative position in the marketplace. An important property for any material used as a drier screen in a paper making machine is that the material should have good hydrolytic stability and good dimensional stability.

The preferred poly(ethylene naphthalenedicarboxylate) [PEN] polymers of this invention are generally based on 2,6-naphthalenedicarboxylic acid but may be based on naphthalenedicarboxylic acid containing up to about 25 mole % of one or more naphthalenedicarboxylic acid isomers such as the 1,2-, 1,3-, 1,4-, 1,5-, 1,6-, 1,7-, 1,8-, 2,3-, 2,4-, 2,5-, 2,7-, or 2,8-isomers. PEN polymers based primarily on 1,4-, 1,5-, or 2,7-naphthalenedicarboxylic acid are also useful.

The preferred poly(1,4-cyclohexylenedimethylene naphthalenedicarboxylate) polymers are based on the above described naphthalenedicarboxylic acids or their lower alkyl esters and cis or cis/trans mixtures of 1,4-cyclohexanedimethanol. Polymers based on 2,6-naphthalenedicarboxylic acid and a 30/70 cis/trans mixture of 1,4-cyclohexanedimethanol melts at a very high temperature (~350° C.) and are thus difficult to process. Similar polymers based on the cis isomer or cis/trans mixture containing up to about 50% trans 1,4-cyclohexanedimethanol melt at more reasonable temperatures and thus are preferred.

Another way of decreasing the melting points of these high melting polyesters is to include up to about 15 mole % of modifying dibasic acids or glycols.

Suitable modifying dibasic acids generally contain 4 to about 36 carbon atoms and may include fumaric, succinic, adipic, glutaric, azelaic, sebacic, dimer, terephthalic, isophthalic, resorcinoldiacetic, diglycolic, 4,4'-oxybis [benzoic], biphenyldicarboxylic, cis or trans-1,4-cyclohexanedicarboxylic, 4,4'-methylenedibenzoic, trans-4,4'-stilbenedicarboxylic acid sulfoisophthalic acid and the like. Modifying glycols may contain from about 2 to 12 carbon atoms and may be aliphatic or cycloaliphatic in nature. Suitable modifying glycols include ethylene glycol, 1,3-propanediol, 1,4-butanediol, 1,5-pentanediol, 1,6-hexanediol, 2,2-dimethyl-1,3-propanediol, 1,10-decanediol, diethylene glycol, 2,2,4,4-tetramethyl-1,3-cyclobutanediol, cis- or trans-1,4-cyclohexanedimethanol and the like.

The homo- and copolyesters of this invention are readily spun into monofilaments using conventional procedures well known in the art. Such fibers have excellent resistance to hydrolytic degradation at elevated temperatures, excellent dimensional stability, and resistance to deformation.

Useful polymers have inherent viscosity (I.V.) values in the range of about 0.4 to about 1.2 dL/g as measured in 60/40 (wt./wt.) phenol/tetrachloroethane at a temperature of 250° C. at a concentration of 0.5 g/100 mL.

The polyesters of this disclosure are readily prepared from the appropriate dibasic acids or their lower alkyl esters and the appropriate glycol or glycol mixtures using typical polycondensation reaction conditions. They may be made by either batch or continuous processes. Typical polyesterification catalysts which may be used include titanium alkoxides, dibutyl tin dilaurate, combinations of zinc, manganese, or magnesium acetates or benzoates with antimony oxide or antimony triacetate and the like.

These polyesters may be made by either melt phase or solid state polycondensation methods. A preferred way to make the polyesters is to prepare polymers with an I.V. value of about 0.3 dL/g to about 0.5 dL/g in the melt phase and then to further increase the molecular weight of the polymer by solid state polycondensation of polymer in powder, granule or pellet form at a temperature above the glass transition temperature but below the melting point of the polyester.

The polyesters of this invention may contain conventional additives and ingredients which do not deleteriously affect their end use. For example, additives such as fillers, lubricants, light and heat stabilizers, extrusion aids, dyes, pigments and the like may be used. Although the polymers may be reacted with carbodiimides, their use is not desirable because of the toxicity of the carbodiimides.

For the purposes of this invention, the term "fiber" refers to a shaped polymeric body of high aspect ratio capable of being formed into two or three dimensional articles as in woven or nonwoven fabrics. Fiber further refers to staple, multifilament or monofilament forms. Also, for the purposes of this invention, the melting point is determined by any means known in the art. The preferred method of determining melting point and glass transition temperature is by the differential scanning calorimetry (DSC) well known in the art. The melting can be specifically defined in this context as the temperature of the highest peak on the endotherm of the plot produced via DSC.

It is preferred that the polyesters or copolyester useful in the invention have a melting point in the range of at 225° to 325° C., more preferably, 240° to 310° C., even more preferably, 250° to 295° C. It is also preferred that the polyesters or copolyesters useful in the invention preferably have a glass transition temperature (Tg) in the range of 100° to 150° C., more preferably, 110° to 140° C., even more preferably 115° to 135° C. and particularly 120° to 125° C.

The polyester material may include a proportion of a stabilizer. Typical stabilizers include carbodiimides or more conventional phenolic or phosphorus-containing stabilizers present in an amount of about 0.1 to 5% preferably 0.3 to 3% by weight.

As stated above, one of the more important features of paper machine clothing in accordance with the present invention is its potential use in high temperature sections of a paper making machine, in particular dryer fabrics and dryer screen fabrics, since the material from which it is made is not readily hydrolyzed. Unexpectedly, materials in accordance with the present invention show an exceptional degree of stability over time when compared with conventional polyester materials currently employed.

While the invention is particularly concerned with materials suitable for use in the drying section of a paper making machine, it will be appreciated by the person skilled in the art that with the tendency towards ever higher temperatures in the forming and pressing sections of a paper making machine, articles of paper making clothing in accordance with the present invention can well be produced for use in both the pressing section and the forming section. In the forming section it is possible to form an open weave using monofilament materials which allow for adequate support of the solid materials in the furnish and yet allow sufficient dewatering to produce a coherent sheet preparatory to pressing. In the pressing section, by providing both the support layer and at least a proportion of the surface layer of the pressing fabric in accordance with the present invention, pressing fabrics much more tolerant of high temperature operation are produced.

The invention, therefore, is concerned not only with the production of paper machine clothing (PMC) materials which may be of woven or spiral or of other suitable monofilament structures, in which monofilaments may extend in both the machine direction and the cross direction of the fabric, but also include other PMC structures. Such polyester may be used to produce PMC fabrics comprised of staple, multifilament, and/or monofilament fibres.

Typical range of sizes of monofilaments used in Press Fabrics and Dryer Fabrics are 0.20 mm–1.27 mm in diameter or the equivalent mass in cross-section in other cross-section shapes, e.g. square or oval.

For forming fabrics, finer monofilaments are used, e.g. as small as 0.05 mm while special industrial applications may use monofilaments up to 3.8 mm.

Percentages expressed herein refer to weight percentages unless other specified. The term (I.V.) refers to inherent viscosity expressed in dL/g measured as described herein.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

Poly(ethylene 2,6-naphthalenedicarboxylate) is prepared by stirring with heating 146.4 g of dimethyl 2,6-naphthalenedicarboxylate, 74.4 g of ethylene glycol, and 100 pm of titanium from titanium tetraisopropoxide. The reaction is kept under nitrogen at 190° C. for 1 hour and then the temperature is increased to 210° C. for 1 hour while methanol distills out of the reaction mixture. The temperature is raised to 285° C., the nitrogen is removed, and a vacuum is applied to the reaction. The melt condensation is continued at 285° C. for 45 minutes under 0.2 mm of mercury pressure. The heat is removed and the reaction mixture is let down to atmospheric pressure with nitrogen. The polymer has an inherent viscosity of 0.72 as measured in a 40/35/25 parachlorophenol/tetrachloroethane/phenol solution. The polymer has a melting point (Tm) of 263° C. and glass transition temperature (Tg) of 126° C.

Example 2

Ethylene glycol is reacted with a mixture of dimethyl 2,6-naphthalenedicarboxylate and dimethyl 2,7-naphthalenedicarboxylate according to the procedure of Example 1 to produce a copolyester containing 5 mole % of the 2,7-naphthalenedicarboxylate moiety. The polymer has an I.V. of 0.65 dL/g.

Example 3

Ethylene glycol is reacted with a mixture of dimethyl 2,6-naphthalenedicarboxylate and dimethyl 2,7-naphthalenedicarboxylate to provide a copolyester containing 10 mole % of the 2,7-naphthalenedicarboxylate moiety. The sample has an I.V. of 0.65 dL/g.

Example 4

Dimethyl 2,6-naphthalenedicarboxylate is reacted with ethylene glycol and diethylene glycol to provide a poly(ethylene 2,6-naphthalenedicarboxylate) copolyester containing 10 mole % diethylene glycol. The polymer has an inherent viscosity of 0.73 dL/g.

Example 5

Dimethyl 2,6-naphthalenedicarboxylate is reacted with ethylene glycol and diethylene glycol to provide a copolyester containing 15 mole % diethylene glycol. The polymer has an I.V. of 0.72 dL/g.

Example 6

A PEN copolyester containing 2 mole % 2,7-naphthalenedicarboxylic acid is prepared according to the procedure of Example 1. The copolymer has an I.V. of 0.72.

Example 7

Poly(ethylene 2,6-naphthalenedicarboxylate) modified with 5 mole % 1,4-cyclohexanedimethanol (30/70 cis/trans ratio) is prepared from 146.4 g of dimethyl 2,6-naphthalenedicarboxylate, 70.68 g of ethylene glycol, 4.32 g of 1,4-cyclohexanedimethanol and 100 pm titanium from titanium tetraisopropoxide using the procedure described in Example 1. The polymer has an inherent viscosity of 0.89 dL/g. This copolyester has a melting point of 255° C. and a glass transition temperature of 125° C.

Example 8

Dimethyl 2,6-naphthalenedicarboxylate is reacted with ethylene glycol according to the procedure of Example 1 to produce pellets of poly(ethylene 2,6-naphthalenedicarboxylate) which has an inherent viscosity of 0.55 dL/g as measured in a 60/40 phenol/tetrachloroethane solution. The sample is crystallized at about 185° C. for about one hour in a forced-air oven and subsequently solid-phase polymerized at about 245° C. to an inherent viscosity of 0.75 dL/g. Using a stream of dry nitrogen to remove the liberated ethylene glycol, the solid-phase polymerized sample is redried at 150° C. in a dehumidifier dryer for about 16 hours prior to spinning the polymer into monofilaments.

Example 9

Dimethyl 2,6-naphthalenedicarboxylate is reacted with cis 1,4-cyclohexanedimethanol according to Example 1 to produce poly(1,4-cyclohexylenedimethylene 2,6-naphthalenedicarboxylate) having an I.V. of 0.42. The polymer is granulated and further polymerized under solid state polycondensation conditions according to the procedure described in Example 8. This polyester has an I.V. of 0.93 and a Tm value of 278° C.

Example 10

Dimethyl 2,6-naphthalenedicarboxylate is reacted with a 50/50 cis/trans mixture of 1,4-cyclohexanedimethanol according to the procedure of Example 1 to produce a prepolymer having an I.V. of 0.48. This sample is further polymerized under solid state polycondensation conditions to provide a polymer with I.V. of 0.87. It has a Tm of 290° C.

Example 11

Dimethyl 2,6-naphthalenedicarboxylate is reacted with 50/50 cis/trans 1,4-cyclohexanedimethanol and ethylene glycol to provide a copolyester containing 7 mole % ethylene glycol. The prepolymer has an I.V. of 0.39. This prepolymer is further polymerized under solid state polycondensation conditions to provide a polymer with I.V. of 0.85. It has a Tm of 279° C.

Example 12

Monofilaments are prepared by conventional monofilament melt spinning process at 300° C. using a 0.72 inherent viscosity (IV) poly(ethylene 2,6-naphthalenedicarboxylate) polymer (PEN) having no additional hydrolytic or dry heat stabilizers. The monofilaments are drafted using conventional monofilament processing (2 stage, water and hot air) to obtain monofilaments having a tenacity of 5.3 grams per denier (gpd), 25% elongation to break, initial modulus of 120 gpd, 20 mil. diameter, and 0.64 IV. The above monofilaments along with stabilized commercial poly(ethylene terephthalate) monofilaments (PET) and monofilaments prepared from an unstabilized poly(1,4-cyclohexanedimethyleneterephthalate) modified with 5 mole % isophthalic acid (PCTA polymer) are subjected to hydrolytic (250° F., saturated stream autoclave) and dry heat stability (350° F. in oven air) testing. The initial properties of the PET monofilament are 4.1 gpd, 37% elongation, 71 gpd modulus, 20 mil. diameter, and 0.82 IV. After 12 days in the hydrolytic test the PEN monofilament has 75% of its initial tensile strength (4 gpd), the PET has 0%, and the PCTA polymer has 85% (2.6 gpd). After 12 days in dry heat the PEN has 77% of it's initial tensile strength (4.1 gpd), the PET has 65% (2.7 gpd), and the PCTA polymer has 0%. The above example demonstrates the superior absolute tensile strength retention of unstabilized PEN monofilaments in both hydrolytic and dry heat stability testing.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

I claim:

1. An article of paper machine fabric used in a papermaking machine which is essentially a fibrous structure comprising monofilament yarns wherein said monofilament yarns comprise a polyester comprising from about 85 to 100 mole % of 2,6-naphthalenedicarboxylic acid and about 85 to 100 mole % of ethylene glycol or 1,4-cyclohexanedimethanol, based on the total mole percentage for the glycol portion and for the acid portion of said polyester each equalling 100 mole %.

2. The article of claim 1 wherein said polyester comprises from about 0 to 25 mole % of one or more naphthalenedicarboxylic acid isomers selected from the group consisting of 1,2-naphthalenedicarboxylic acid, 1,3-naphthalenedicarboxylic acid, 1,4-naphthalenedicarboxylic acid, 1,5-naphthalenedicarboxylic acid 1,6-naphthalenedicarboxylic acid, 1,7-naphthalenedicarboxylic acid, 1,8-naphthalenedicarboxylic acid, 2,3-naphthalenedicarboxylic acid, 2,4-naphthalenedicarboxylic acid, 2,5-naphthalenedicarboxylic acid and 2,8-naphthalenedicarboxylic acid.

3. The article of claim 1 wherein said naphthalenedicarboxylic acid isomers are selected from the group consisting of 1,4-, 1,5-, or 2,7-naphthalenedicarboxylic acid.

4. The article of claim 1 comprising about 0 to 15 mole % of modifying glycols.

5. The article of claim 1 comprising from 0 to 15 mole % of modifying dicarboxylic acids other than naphthalenedicarboxylic acid isomers.

6. The article of claim 5 wherein said aliphatic glycol is 1,4-cyclohexanedimethanol.

7. The article of claim 6 wherein said 1,4-cyclohexanedimethanol is present as either a cis isomer singly, or as cis/trans mixtures with a trans isomer.

8. The article of claim 7 wherein said trans isomer is present at an amount of up to 50 mole percent.

9. The article of claim 8 wherein said 1,4-cyclohexanedimethanol is present in a 70/30 cis/trans mixture.

10. A paper machine dryer fabric, which comprises:
    interwoven machine direction monofilament yarns of a synthetic, polyester resin and cross-machine direction synthetic, polyester resin monofilament yarns, said monofilament yarns comprising:
    a polyester comprising from about 85 to 100 mole % of 2,6-naphthalenedicarboxylic acid and about 85 to 100 mole % of ethylene glycol or 1,4-cyclohexanedimethanol, based on the total mole percentage for the glycol portion and for the acid portion of said polyester each equalling 100 mole %.

11. The article of claim 10 wherein said polyester comprises from about 0 to 25 mole % of one or more naphthalenedicarboxylic acid isomers selected from the group consisting of 1,2-naphthalenedicarboxylic acid, 1,3-naphthalenedicarboxylic acid, 1,4-naphthalenedicarboxylic acid, 1,5-naphthalenedicarboxylic acid 1,6-naphthalenedicarboxylic acid, 1,7-naphthalenedicarboxylic acid, 1,8-naphthalenedicarboxylic acid, 2,3-naphthalenedicarboxylic acid, 2,4-naphthalenedicarboxylic acid, 2,5-naphthalenedicarboxylic acid, 2,7-naphthalenedicarboxylic acid and 2,8-naphthalenedicarboxylic acid.

12. The article of claim 11 wherein said naphthalenedicarboxylic acid isomers are selected from the group consisting of 1,4-naphthalenedicarboxylic acid, 1,5-naphthalenedicarboxylic acid, or 2,7-naphthalenedicarboxylic acid.

13. The article of claim 10 comprising about 0 to 15 mole % of modifying glycols.

14. The article of claim 10 comprising from 0 to 15 mole % of modifying dicarboxylic acids other than naphthalenedicarboxlic acid isomers.

15. The fabric of claim 10 which is a woven, single layer fabric.

* * * * *